United States Patent
Corbacio et al.

(10) Patent No.: US 11,094,195 B2
(45) Date of Patent: Aug. 17, 2021

(54) DYNAMIC PREDICTIVE SYSTEMS FOR VEHICLE TRAFFIC MANAGEMENT

(71) Applicant: International Business Machines Corporation, Armonk, NY (US)

(72) Inventors: Mariella Corbacio, Rome (IT); Patrizia Manganelli, Rome (IT); Elisa Matteagi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 16/123,015

(22) Filed: Sep. 6, 2018

(65) Prior Publication Data
US 2020/0082723 A1    Mar. 12, 2020

(51) Int. Cl.
| | |
|---|---|
| *B60W 30/00* | (2006.01) |
| *G08G 1/16* | (2006.01) |
| *B60W 30/095* | (2012.01) |
| *B60W 50/14* | (2020.01) |
| *H04W 4/46* | (2018.01) |
| *H04W 4/021* | (2018.01) |
| *G08G 1/0965* | (2006.01) |

(52) U.S. Cl.
CPC ......... *G08G 1/163* (2013.01); *B60W 30/0953* (2013.01); *B60W 30/0956* (2013.01); *B60W 50/14* (2013.01); *G08G 1/0965* (2013.01); *H04W 4/021* (2013.01); *H04W 4/46* (2018.02); *B60W 2050/143* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 6,529,831 | B1 | 3/2003 | Smith et al. |
| 6,958,707 | B1 | 10/2005 | Siegel |
| 8,350,721 | B2 | 1/2013 | Carr |
| 8,842,021 | B2 | 9/2014 | Behm |
| 9,254,781 | B2 | 2/2016 | Applebaum |
| 2007/0132609 | A1 | 6/2007 | Stackelhouse |
| 2008/0267416 | A1 | 10/2008 | Goldstein |
| 2011/0181443 | A1 | 7/2011 | Gutierrez |
| 2015/0254978 | A1 | 9/2015 | Mawbey |

(Continued)

OTHER PUBLICATIONS

Features of 911 ETA, 911ETA, 2010, 1 page.

(Continued)

*Primary Examiner* — James M McPherson
(74) *Attorney, Agent, or Firm* — Richard Wilhelm; Edell, Shapiro & Finnan, LLC

(57) ABSTRACT

Methods, systems and computer readable media are provided for traffic management between a first vehicle and a second vehicle. A navigation system of the second vehicle may receive position and route information describing a route that the first vehicle is projected to follow. The navigation system of the second vehicle may determine a geographical area, wherein the geographical area encompasses locations determined to be reachable by the second vehicle within a specified time interval. The navigation system of the second vehicle may generate a warning when the route of the first vehicle and the geographical area of the second vehicle intersect with each other.

20 Claims, 7 Drawing Sheets

(56) References Cited

U.S. PATENT DOCUMENTS

2017/0270792 A1    9/2017  Breton
2017/0276495 A1    9/2017  Krishnan
2018/0113448 A1*   4/2018  Nagda .................. G05D 1/0293
2019/0228598 A1*   7/2019  Wang ...................... H04W 4/08

OTHER PUBLICATIONS

Purkayastha, Smart traffic management system for emergency services, Nov. 19, 2015, 6 pages.
RS, Professional GPS navigation & dispatch system for emergency fleets, Sygic, Oct. 16, 2015, 3 pages.
GPS Alerts Drivers to Emergency Vehicles, https://www.thedenverchannel.com/news/gps-alerts-drivers-to-emergency-vehicles, Jul. 1, 2010, 3 pages.

* cited by examiner

DYNAMIC PREDICTIVE SYSTEMS FOR VEHICLE TRAFFIC MANAGEMENT

BACKGROUND

1. Technical Field

Present invention embodiments relate to traffic management, and more specifically, to dynamically predicting geographical areas in which a first group of vehicles are located relative to a second group of vehicles.

2. Discussion of the Related Art

Emergency vehicles often need to navigate through highly congested areas to reach desired destinations. Traffic often causes significant delays, leading to longer transport times and increased risk of patient mortality, which is frustrating for both emergency vehicles and non-emergency vehicles.

Additionally, other distractions may be present including music from a car radio or DVD player, which may mask sirens of rescue or police vehicles. Drivers may be unaware of approaching emergency vehicles, and therefore, may fail to take appropriate action, such as moving to the shoulder or emergency lane, thereby causing additional delays in traffic fluidity in times of emergency. Further, drivers who are unaware of approaching emergency vehicles may be at increased risk of road accidents.

Traffic management applications are commercially available. However, these applications rely on precise locations of vehicles, often utilizing location syncing of vehicles, and may not provide a custom alert to a driver of an approaching emergency vehicle.

SUMMARY

According to embodiments of the present invention, methods, systems and computer readable media are provided for traffic management between a first vehicle and a second vehicle. A navigation system of the second vehicle may receive position and route information describing a route that the first vehicle is projected to follow. The navigation system of the second vehicle may determine a geographical area, wherein the geographical area encompasses locations determined to be reachable by the second vehicle within a specified time interval. The navigation system of the second vehicle may generate a warning when the route of the first vehicle and the geographical area of the second vehicle intersect with each other.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other objects, features and advantages of the present disclosure will become more apparent.

DETAILED DESCRIPTION

Present techniques are directed towards a dynamic method that notifies a driver of a non-priority vehicle when a priority vehicle (e.g., an emergency vehicle, etc.) is in proximity. Present techniques may provide real-time or near real-time services to a non-priority vehicle using a predictive methodology, and therefore, direct communication between the non-priority vehicle and priority vehicle is not needed. In some aspects, the driver of the non-priority vehicle is notified when the priority vehicle is within a specific geographical area. Notifications may include sending a message to the driver's cellular phone to generate a beeping or buzzing sound, sending a notification to the non-priority vehicle navigation system to generate an audible warning, or to another electronic device that generates a sound to alert the driver.

Figure 1:
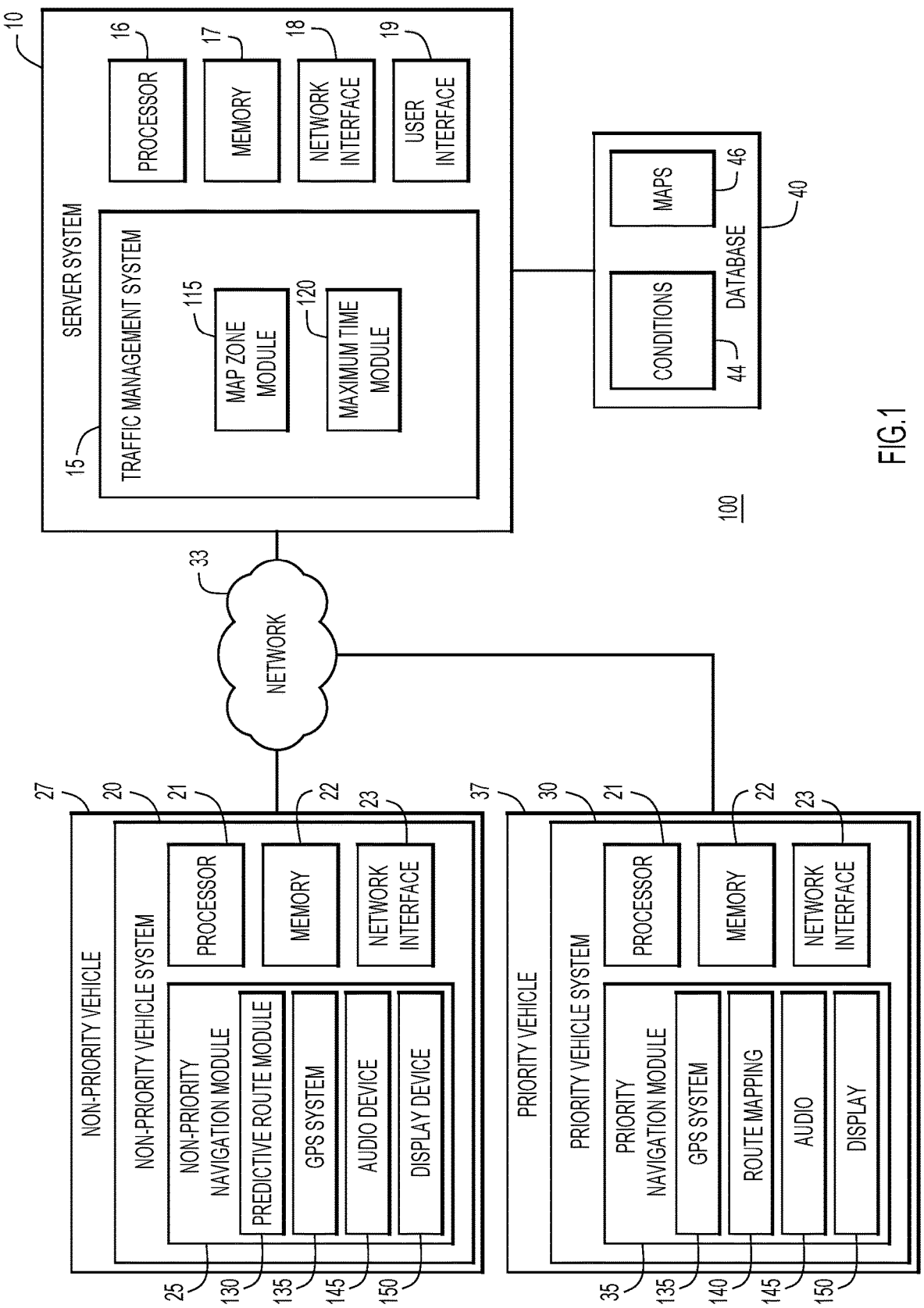
FIG. 1 is a block diagram of an example computing environment for determining proximity of a non-priority vehicle to a priority vehicle in accordance with embodiments of the present disclosure.

An example environment for use with present invention embodiments is illustrated in FIG. 1. Specifically, the environment includes one or more server systems 10, a non-priority vehicle system 20 of a non-priority vehicle 27, and a priority vehicle system 30 of a priority vehicle 37. Server system 10, non-priority vehicle system 20, and priority vehicle system 30 may be remote from each other and may communicate over a network 33. The network may be implemented by any number of any suitable communications media (e.g., wide area network (WAN), local area network (LAN), Internet, Intranet, etc.).

Non-priority vehicle system 20 determines a geographical area in which the non-priority vehicle 27 is predicted to travel in a maximum time interval. When a route of the priority vehicle is predicted to intersect with the geographical area, the non-priority vehicle system 20 may provide a notification to the driver of the non-priority vehicle 27, indicating the presence of the priority vehicle within the geographical area.

Priority vehicle system 30 determines location coordinates of a priority vehicle and a route to a specified location, and transmits this information to server system 10. The priority vehicle system 30 may provide this information to server system 10 on a periodic basis, in order to provide updated location coordinates during travel to the specified location (e.g., emergency site). In other aspects, the priority vehicle system 30 may provide a location and route to the server system 10 once, and the position of the priority vehicle may be predicted based on projected route and current travel conditions.

A database system 40 may store various information for the analysis (e.g., conditions 44 and maps 46). Conditions 44 may include conditions that impact the flow of traffic, including but not limited to, road closures, traffic congestion, weather conditions, accidents, construction, etc. Conditions may be periodically updated (e.g., every 5 minutes, every 10 minutes, every 15 minutes, etc.). Maps 46 may include maps of road infrastructure, which is used to determine routes, geographical areas, and map zones. The database system 40 may be implemented by any conventional or other database or storage unit, may be local to or remote from server system 10, and may communicate via any appropriate communication medium (e.g., local area network (LAN), wide area network (WAN), Internet, hardwire, wireless link, Intranet, etc.). The non-priority vehicle system 20 and priority vehicle system 30 may present a graphical user (e.g., GUI, etc.) or other interface (e.g., command line prompts, menu screens, etc.) as part of non-priority navigation module 25 and priority navigation module 35 to solicit information from users pertaining to destinations, and may provide information regarding vehicle proximity (e.g., the proximity of a non-priority vehicle to a priority vehicle, etc.).

Non-priority vehicle system 20 and priority vehicle system 30 may be implemented by any conventional or other computer systems preferably equipped with a display or monitor, a base (e.g., including at least one processor 21, one or more memories 22 and/or internal or external network interfaces or communications devices 23 (e.g., network wireless cards, etc.)), optional input devices (e.g., a keyboard, mouse or other input device), and any commercially available and custom software (e.g., communications software, non-priority navigation module 25, priority navigation module 35, interface software, etc.).

Server system 10 may be implemented by any conventional or other computer systems preferably equipped with a display or monitor, a base (e.g., including at least one processor 16, one or more memories 17, and/or internal or external network interfaces or communications devices 18 (e.g., modem, network cards, etc.)), optional input devices (e.g., a keyboard, mouse or other input device), and any commercially available and custom software (e.g., server/communications software, traffic management system 15, browser/interface software, etc.).

Server system 10 includes a traffic management system 15 to manage traffic flows for vehicles having priority (e.g., such as emergency vehicles), and to notify non-priority vehicles of when a priority vehicle is within the geographical area determined by the non-priority vehicle. Traffic management system 15 may receive location and route information from a priority vehicle system 30, and may transmit this information to non-priority vehicles within a map zone (e.g., to all non-priority vehicles within the map zone containing the priority vehicle). In some aspects, while the destination of the priority vehicle may be received by the non-priority vehicle, the destination may not be displayed to the driver of the non-priority vehicle. Instead, the driver of the non-priority vehicle may receive a notification when the priority vehicle is within the geographical area determined by the non-priority vehicle. Traffic management system 15 may include one or more modules or units to perform the various functions of present invention embodiments described herein. The various modules (e.g., map zone module 115, maximum time module 120, etc.) may be implemented by any combination of any quantity of software and/or hardware modules or units, and may reside within memory 17 of the server for execution by processor 16.

Map zone module 115 may receive location coordinates and route information from a plurality of priority vehicle systems 30. The map zone module may provide the location and route of the priority vehicle to vehicles in a particular map zone (e.g., to non-priority vehicles within the map zone comprising the priority vehicle). Traffic management system may also include a maximum time module 120, which sets the maximum time interval for determining travel distance of the non-priority vehicle. The maximum time interval may be provided by the traffic management system 15 or may be entered by the driver of the non-priority vehicle 27. In some embodiments, multiple priority vehicles may be present in the geographical area. In some aspects, the warning may indicate to the non-priority vehicle driver, the number of priority vehicles within the geographical area.

Non-priority vehicle system 20 may comprise a predictive route module 130, a GPS system 135, an audio device 145, and a display device 150 (e.g., such as a smartphone). The non-priority vehicle system 20 may also comprise network interface 23, which may be used for internet connectivity. Internet communication is needed to receive from traffic management system 15, routes of priority vehicles (e.g., ambulances) that belong to the same map zone as the non-priority vehicle.

GPS system 135 may determine the location of the non-priority vehicle, and may provide this information to predictive route module 130. Predictive route module 130 may obtain location coordinates and the road of the non-priority vehicle 27, along with a maximum time interval. The predictive route module 130 may compute a geographic area corresponding to the maximum distance that the non-priority vehicle may travel within the maximum time interval. If the route of the priority vehicle and the geographical area of the non-priority vehicle intersect, a warning may be provided to the driver of the non-priority vehicle, via the audio device 145 or display device 150.

Priority vehicle system 30 may comprise a GPS system 135, an audio device 145 and a display device 150 (e.g., such as a smartphone). The priority vehicle system may also comprise network interface 23, which may be used for internet connectivity, which is needed to provide to traffic management system 115 routes of priority vehicles (e.g., ambulances). In this case, the GPS system 135 may provide location coordinates to traffic management system 15 along with a route to the specified destination via network interface 23. In some embodiments, the priority vehicle may complete its assignment (e.g., response to an event), and may transition to a non-priority vehicle. In this case, the presence of the priority vehicle within the geographical area (as indicated by the display of the non-priority vehicle) may be removed.

Figure 2A:
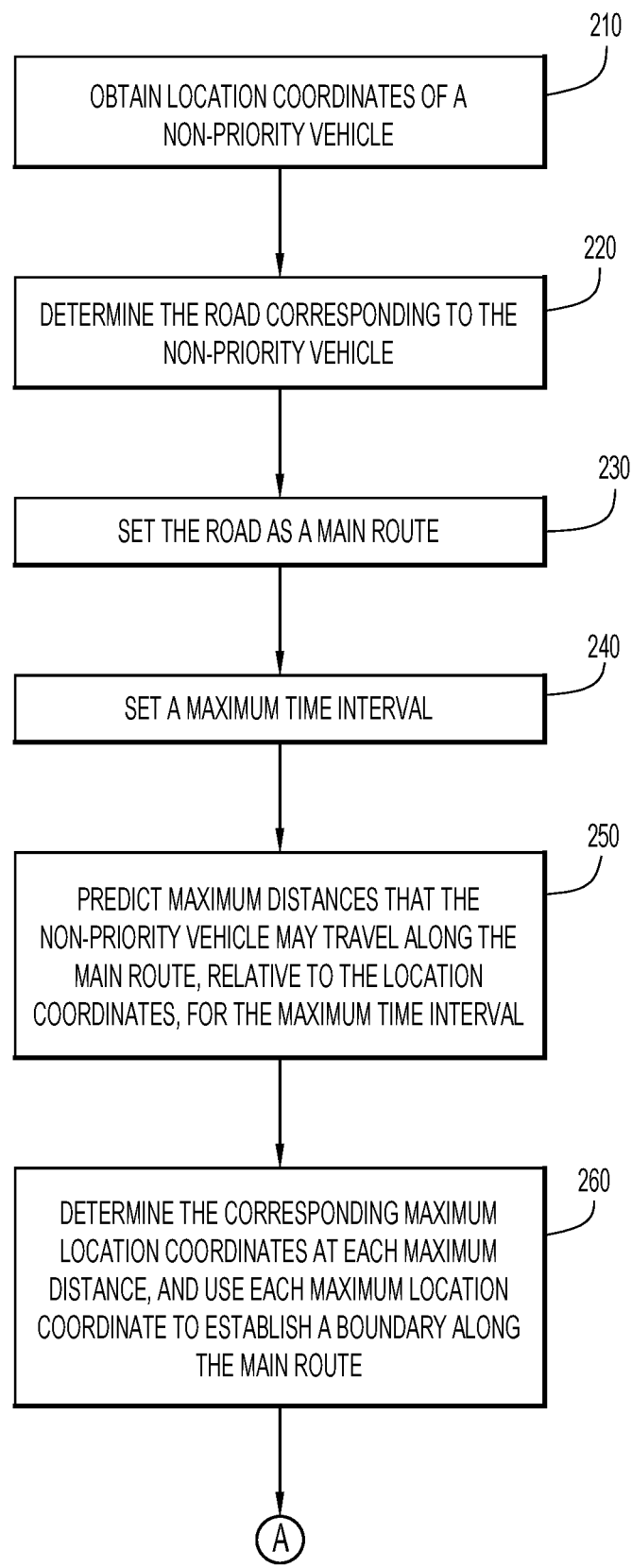
FIGS. 2A-2B are flow charts of example operations of determining proximity of a non-priority vehicle to a priority vehicle from the perspective of the non-priority vehicle, according to embodiments of the present disclosure.
Figure 2B:
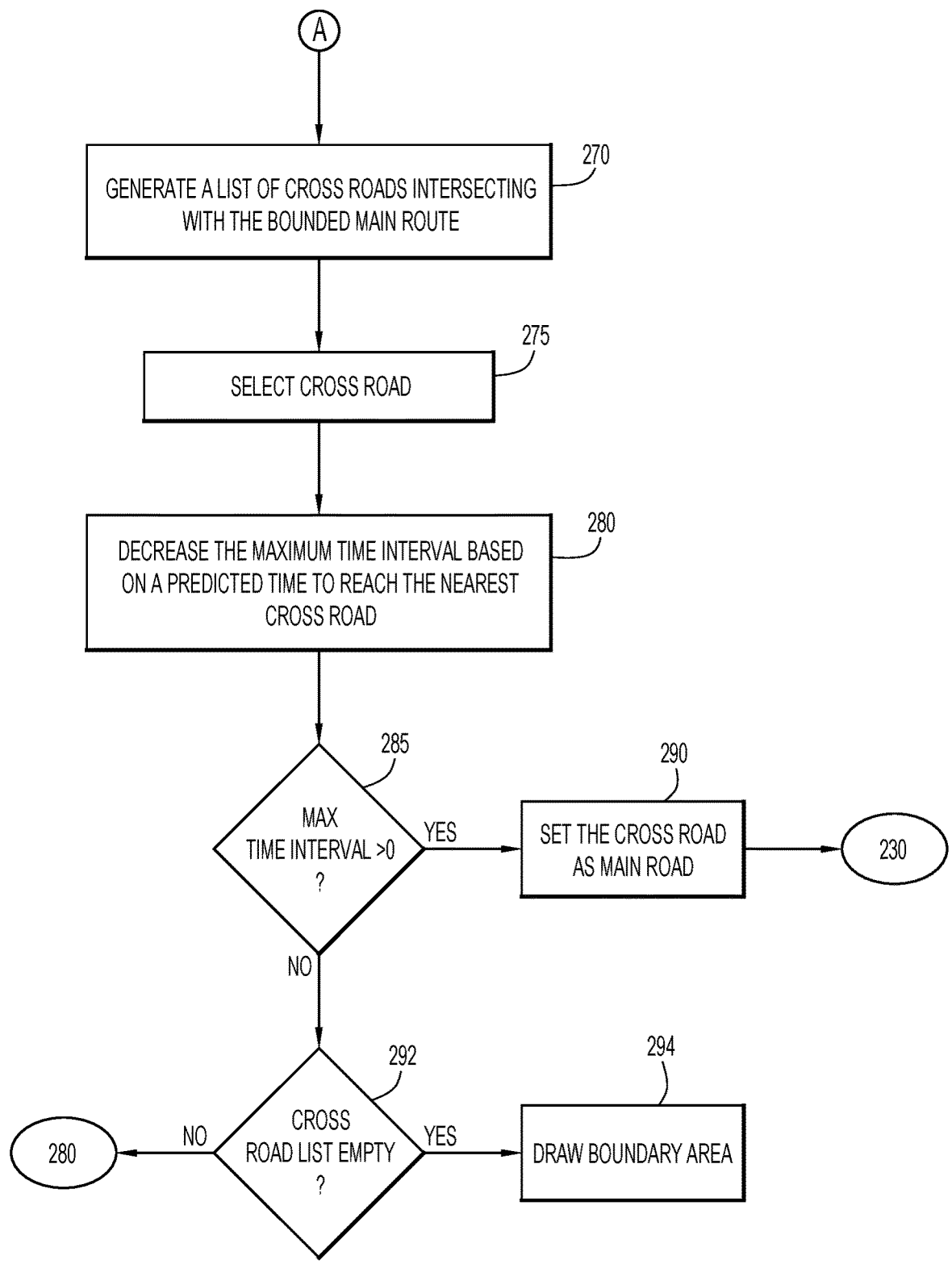

FIGS. 2A-2B show a flowchart of example operations for predicting proximity within a geographical area of a priority vehicle relative to a non-priority vehicle. At operation 210, location coordinates are obtained by GPS system 135 of a non-priority vehicle 27 and provided to predictive route module 130. At operation 220, a road corresponding to the non-priority vehicle is determined by GPS system 135 and provided to predictive route module 130.

The non-priority vehicle may be equipped with a predictive route module 130 that predicts routes (e.g., all possible routes) of the non-priority vehicle within a time frame (e.g., a maximum time interval). To determine a particular route, the following series of operations (230-294) may be performed. At operation 230, the predictive route module 130 of the non-priority vehicle may set the road as a main route. At operation 240, a maximum time interval may be set by the predictive route module 130 of the non-priority vehicle. In some aspects, the maximum time interval may be set by a user (e.g., a driver of the non-priority vehicle). In other aspects, the maximum time interval may be transmitted by the traffic management system 15.

At operation 250, maximum distances that the non-priority vehicle may travel along the main route for the maximum time interval is predicted. For example, for a given location coordinate of the non-priority vehicle, the driver of the non-priority vehicle may travel in a forward direction on a main route for the maximum time interval or may travel in the opposite direction on the main route for the maximum time interval. At operation 260, the maximum location coordinates (at the predicted maximum distances) that the non-priority vehicle may travel (in any direction) along the main route are established, and the maximum location coordinates are used to establish a boundary along the main route (e.g., a bounded main road).

At operation 270, a list of cross roads (typically comprising all available cross roads in any direction) that intersect with the bounded main route is generated. At operation 275, a cross road is selected. At operation 280, the non-priority navigation module 25 predicts the time to reach the cross road. In some cases, the non-priority navigation module may predict the time to reach the cross road in view of traffic conditions, weather conditions, or other events that would impact travel times. The predictive route module 130 may decrease the maximum time interval by this amount. For example, if the maximum time interval is set to ten minutes, and the predicted time to reach the selected cross road is six minutes, then the maximum time interval will be reduced to four minutes.

If the maximum time interval is greater than zero, as determined at operation 285, the system sets the cross road (from 280) to be the main road at operation 290, and returns to operation 230, wherein this procedure is repeated until the maximum time is no longer greater than zero. If the maximum time interval is not greater than zero, the navigation system determines whether the cross road list is empty, at operation 292. If the list is not empty, the process returns to operation 280. If the list is empty, a boundary area (geographical area) is drawn at operation 294. The boundary may be any desired shape, including a square, rectangle, oval, circle star, triangle, polygon, etc. In some aspects, the predictive route module 130 keeps track of the cross roads considered by the method of FIGS. 2A-2B, so that each possible route (e.g., beginning with the bounded main route and continuing through one or more cross roads) within the specified interval is determined.

In some aspects, the driver of the non-priority vehicle may not know the precise location of the priority vehicle. For example, the location of the priority vehicle may be estimated based on an initial location and route as well as traffic conditions. In some cases, the location of the priority vehicle may be updated at scheduled or predetermined intervals, allowing the non-priority vehicle to detect changes in course of the priority vehicle. In other aspects, the driver of the non-priority vehicle may not know the precise location of the priority vehicle, as the geographical area may be automatically reduced as the non-priority vehicle and priority vehicle approach each other (or are projected to approach each other).

In other cases, a portion of the route of the priority vehicle may intersect with the geographical area. Thus, the non-priority vehicle system may be aware of the presence of the priority vehicle without knowing its destination.

In an embodiment, the priority vehicle may be an emergency vehicle or any other public vehicle (e.g., a fire truck, ambulance, police vehicle, bus, etc.) en route to respond to an event at a particular location. The priority vehicle may seek to avoid traffic delays and congestion to optimize response time. In some cases, the non-priority vehicle system determines that the route of the priority vehicle intersects with the geographical area of the non-priority vehicle, and provides an alert to the driver. For example, the display device 150 may provide an alert, showing the predicted position of the priority vehicle and the non-priority vehicle as a function of time based on conditions 44. In other embodiment, the alert may be a voice message, detailing the route and the direction of the priority vehicle with respect to its projected location coordinates and route. In still other embodiments, the non-priority navigation module 25 may be integrated with other functionality within the vehicle, and may lower the volume of a radio or DVD player when the priority vehicle is determined to be in proximity of the non-priority vehicle.

In some embodiments, the message is generated when the prioritized vehicle has special rights (e.g., reaching the scene of an emergency) related to usage of the road infrastructure.

Figure 3:
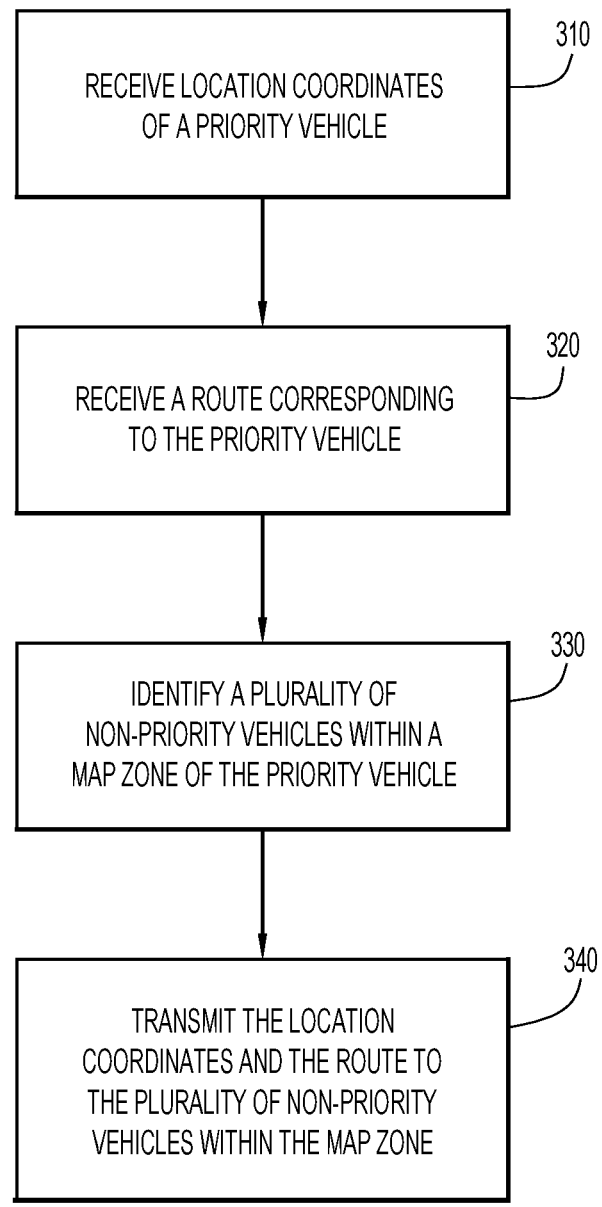
FIG. 3 is a flow chart of example operations of sending received information about a priority vehicle to non-priority vehicles from the perspective of the traffic management system, according to embodiments of the present disclosure.

FIG. 3 is a flow chart showing example operations at the traffic management system 15. At operation 310, location coordinates of a priority vehicle are received. At operation 320, the route of the priority vehicle is received. Upon receiving a request to respond to an emergency situation, the driver of the priority vehicle programs the destination (e.g., location of the emergency situation) into the priority navigation module 35, and a route is generated, and sent to the traffic management system 15. The location coordinates may be periodically provided to traffic management system 15, in order to provide real time or near real time updates of the location of the priority vehicle.

At operation 330, the traffic management system identifies a plurality of non-priority vehicles within a map zone of the priority vehicle. At operation 340, the location coordinates and the route are transmitted to the plurality of non-priority vehicles within the map zone (e.g., using the map zone module 115). A map zone is a portion of a larger map (e.g., in some cases, a square region of a map). By restricting the number of routes using the map zone, communication speed with traffic management system 115 is faster and computational speed of the predictive route module 130 improves. The dimensions of a map zone may be determined by the initial configuration of the non-priority navigation system, may be determined by a user (e.g., the driver), or may be set by traffic management system 15.

Typically, the non-priority navigation module 25 receives, on a periodic basis, the routes of all priority vehicles within the map zone in which it is located. In some embodiments, the navigation module computes the probable or predicted position of each priority vehicle, basing the predicted position of a priority vehicle on received corresponding routes, location coordinates, and on current conditions 44.

The non-priority navigation module, for which an example flowchart is provided in FIGS. 2A-2B, constructs a boundary (a geographic area) that contains all possible routes that the non-priority vehicle could take in a maximum time interval (e.g., five minutes), and sends an alert to the driver of the non-priority vehicle when (and only when) the geographic area of the non-priority vehicle intersects with the route of the priority vehicle.

In some cases, the boundary or geographic area may be modified on a periodic basis. In other cases, the boundary may be updated continuously. As the location coordinates of the non-priority vehicle change, and the maximum time interval remains fixed, the geographic area may be updated. In other embodiments, as the non-priority vehicle becomes closer to the priority vehicle, the time interval may decrease, thereby leading to a corresponding decrease in the size of the boundary and geographic area. By decreasing the boundary and geographic area, privacy regarding information associated with the exact location and completed routes of the priority vehicle may be maintained.

Figure 4:
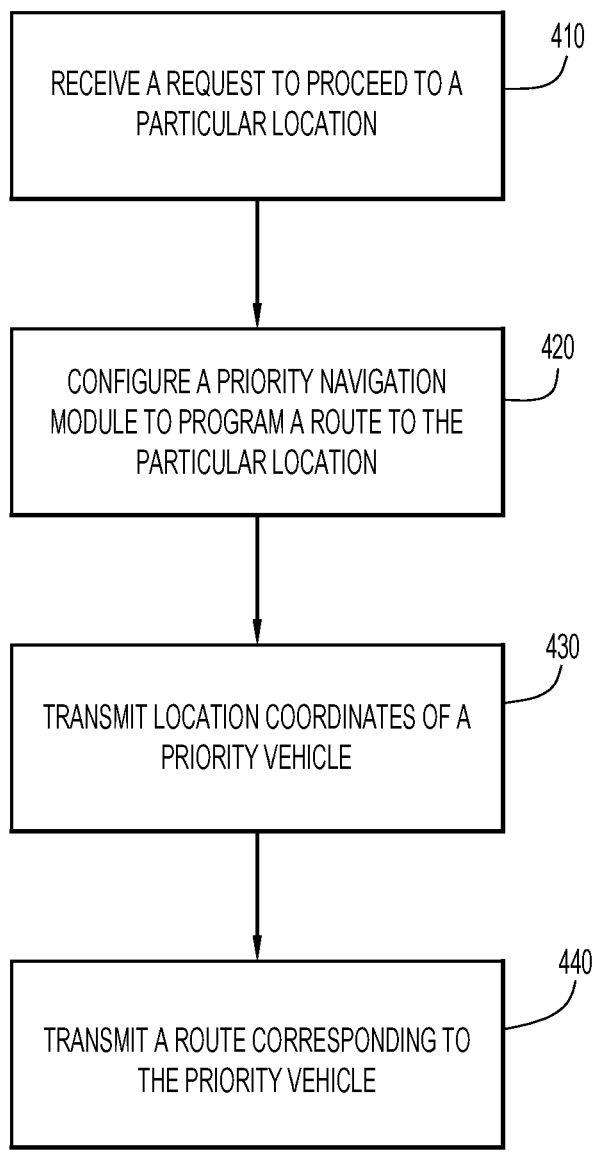
FIG. 4 is a flow chart of example operations of sending location coordinates and route information to the traffic management system from the perspective of the priority vehicle, according to embodiments of the present disclosure.

FIG. 4 is a flow chart showing example operations of priority navigation module 35 for a priority vehicle system 30. At operation 410, a request is received to proceed to a particular location. At operation 420, the priority navigation module 35 programs a route to the particular location. At operation 430, the location coordinates of the priority vehicle are transmitted to the traffic management system 15. At operation 440, a route corresponding to the priority vehicle is transmitted to the traffic management system 15.

Figure 5:
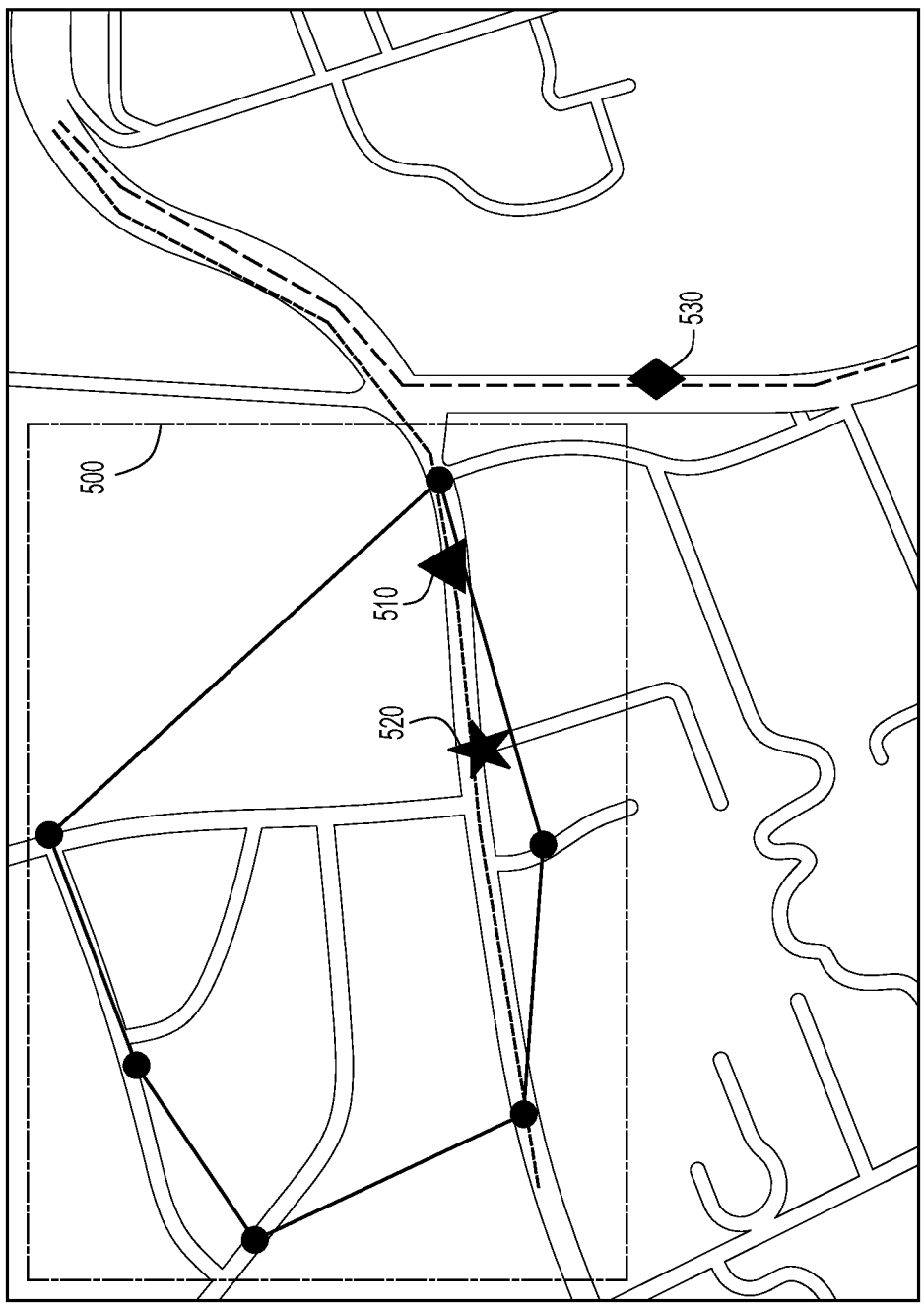
FIG. 5 is an illustration of a geographical area for determining proximity of a non-priority vehicle to a priority vehicle, according to embodiments of the present disclosure.

FIG. 5 is an example illustration of a map and a map zone 500 (e.g., dashed lines) that may be presented to a driver of a non-priority vehicle. In this example, the projected route of the priority vehicle 510 (e.g., the triangle in the map zone) is shown with respect to the position of the non-priority vehicle 520 (e.g., the star).

The other priority vehicle 530 (e.g., the diamond) is not displayed because it is external to the geographical area of the non-priority vehicle (e.g., in this case, a polygon). However, if the non-priority vehicle 520 moves towards the projected route of priority vehicle 530 (shown by the diamond) or vice versa, and the geographical area changes to include the predicted position of the priority vehicle 530, then the priority vehicle 530 as shown by a diamond will be displayed.

Figure 6:
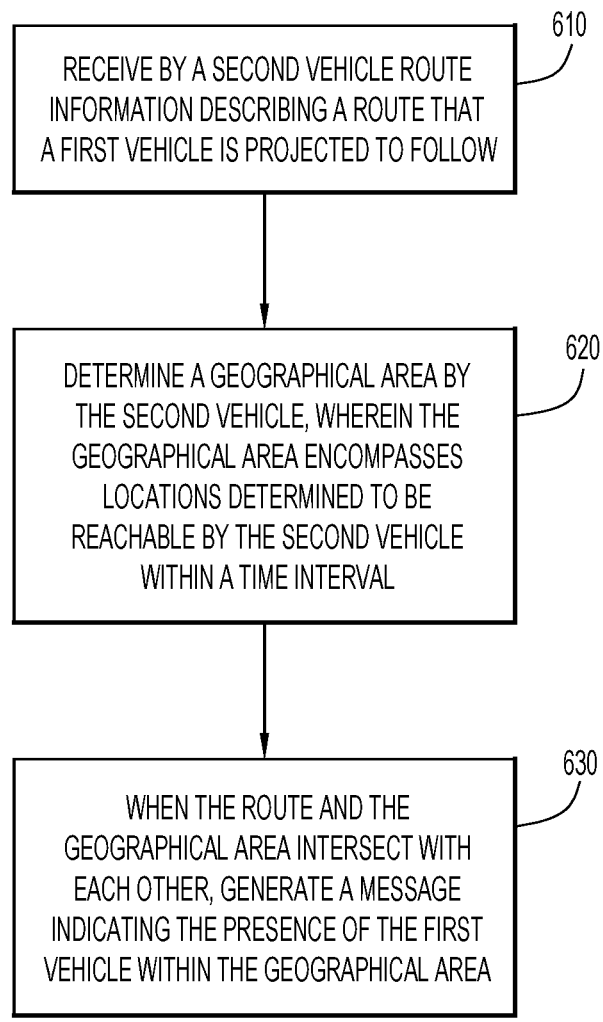
FIG. 6 is a flowchart of example operations for the non-priority vehicle, according to embodiments of the present disclosure.

FIG. 6 is a flow chart of example operations for the non-priority vehicle. At operation 610, route information is received by a second (non-priority) vehicle describing a route that a first (priority) vehicle is projected to follow. At operation 620, a geographical area is determined by the second vehicle, wherein the geographical area encompasses locations determined to be reachable by the second vehicle within a time interval. At operation 630, when the route and the geographical area intersect with each other, a message indicating the presence of the first vehicle within the geographical area of the second vehicle is generated.

The methods, systems and computer readable memory provided herein may provide an immediate audio warning and/or a visual alert of a nearby priority vehicle (e.g., by providing real-time information or near real-time information about the priority vehicle position and approach characteristics). This information may be immediately visible on broad-based devices such as normal navigations systems present on cars, but may also easily be integrated into navigation software for sharing information to a larger community-driven navigation application (e.g., Waze®, etc.). Further, these techniques may avoid providing and sharing sensitive information regarding priority/emergency vehicles. For example, as the non-priority vehicle becomes closer to the priority vehicle, the time interval may automatically decrease, thereby leading to a corresponding decrease in the size of the geographical area and boundary. By decreasing the geographical area and boundary, privacy information associated with the precise location and completed routes of the priority vehicle may be maintained. Additionally, in some aspects, the non-priority vehicle may rely on an estimated or predicted location of the priority vehicle so that the precise location of the priority vehicle may not be known. Thus, the system may obscure the location of the priority vehicle while at the same time providing a notification about the presence of the priority vehicle within a geographical area.

The present systems and methods utilize unconventional tracking techniques, in that rather than relying on vehicle-to-vehicle tracking, geolocation areas may be used. Thus, traffic congestion may be addressed using predictions and estimates within a geolocation area, while maintaining aspects of privacy with regard to priority vehicle location.

Additionally, the non-priority vehicle system may be dynamically updated as a function of time and location. Indications of the presence of priority vehicles within a geographical area may be removed (from the display of the non-priority vehicles), as the non-priority vehicle position changes, as the priority vehicle position changes, or as priority vehicles undergo a change in status to become non-priority vehicles. The system may dynamically alert non-priority vehicles of priority vehicles, using navigation systems and filtering.

These techniques provide an improvement in the field of traffic management. Rather than relying on precise locations of all vehicles within a designated area, which can be computationally time and resource consuming, a streamlined approach is provided in which the system identifies the locations of priority vehicles (not all vehicles). Additionally, non-priority vehicles in different geographical areas (e.g., in different parts of a city) may receive different routes for different priority vehicles. Thus, the system is able to filter a corpus of route information to provide subsets of routes to different non-priority vehicles based on location and geographical area. Thus, rather than tracking all vehicles within an area such as a city, this approach streamlines tracking of priority vehicles in a geographical area based on the non-priority vehicle.

It will be appreciated that the embodiments described above and illustrated in the drawings represent only a few of the many ways of implementing embodiments for traffic management of priority and non-priority vehicles.

The environment of the present invention embodiments may include any number of computer or other processing systems (e.g., navigation systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, priority navigation modules, non-priority navigation systems, etc.). These systems may include any types of monitors and input devices (e.g., keyboard, mouse, voice recognition, etc.) to enter and/or view information.

It is to be understood that the software (e.g., traffic management system 15, non-priority navigation module 25, priority navigation module 35, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., e.g., traffic management system 15, non-priority navigation module 25, priority navigation module 35, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., conditions 44, maps 46, etc.). The database system may be implemented by any number of any conventional or other databases, data stores or storage structures (e.g., files, databases, data structures, data or other repositories, etc.) to store information (e.g., conditions 44, maps 46, etc.). The database system may be included within or coupled to the server and/or navigation systems. The database systems and/or storage structures may be remote from or local to the computer or other processing systems, and may store any desired data (e.g., conditions 44, maps 46, etc.).

The present invention embodiments may employ any number of any type of user interface (e.g., Graphical User Interface (GUI), command-line, prompt, etc.) for obtaining or providing information (e.g., conditions 44, maps 46, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The display may show any information arranged in any fashion, and may be configurable based on rules or other criteria to provide desired information to a user (e.g., priority and non-priority vehicle intersection, location coordinates, map zones, boundaries/geographical areas, alerts, etc.).

The present invention embodiments are not limited to the specific tasks or algorithms described above, but may be utilized for any application in which proximity of a first object needs to be determined with respect to a second object, wherein the first object and second object are mobile.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of monitoring proximity between a first vehicle and a second vehicle comprising:
receiving by the second vehicle route information describing a projected route that the first vehicle is projected to follow and location coordinates of the first vehicle;
identifying, by the second vehicle, a plurality of routes in different directions from a location of the second vehicle, wherein a distance of each identified route of the plurality of routes is sufficient to be traveled by the second vehicle within a predetermined time interval;
determining a geographical area by the second vehicle, wherein the geographical area encompasses and has boundaries defined by the identified routes; and when the projected route and the geographical area intersect with each other, generating a message indicating a presence of the first vehicle within the geographical area of the second vehicle.

2. The method of claim 1, wherein determining the geographical area is based on map data comprising road infrastructure.

3. The method of claim 1, further comprising:
receiving updated location coordinates of the first vehicle;
determining that a location of the first vehicle has become closer to the location of the second vehicle based on the updated location coordinates of the first vehicle;
reducing the time interval by an amount of time corresponding to a travel time of the first vehicle to travel from a location of the location coordinates to a location of the updated location coordinates; and
regenerating the geographical area to have a smaller area based on the reduced time interval.

4. The method of claim 1, further comprising:
receiving a communication indicating the first vehicle no longer has priority over the second vehicle; and
removing a presence of the first vehicle from the geographical area displayed on the second vehicle.

5. The method of claim 1, wherein the second vehicle receives updated location coordinates of the first vehicle on a periodic basis.

6. The method of claim 1, wherein the geographical area is one of a polygon, oval, star, diamond, and a circle.

7. The method of claim 1, further comprising:
determining that a distance between the second vehicle and the first vehicle has decreased;
automatically reducing the time interval; and
recomputing the geographical area to have a smaller area.

8. The method of claim 1, wherein generating the message is based on the first vehicle having priority over other vehicles related to usage of a road infrastructure.

9. A system for monitoring proximity between a first vehicle and a second vehicle comprising at least one processor configured to:
receive by the second vehicle route information describing a projected route that the first vehicle is projected to follow and location coordinates of the first vehicle;
identify by the second vehicle a plurality of routes in different directions from a location of the second vehicle, wherein a distance of each identified route of the plurality of routes is sufficient to be traveled by the second vehicle within a predetermined time interval;
determine a geographical area by the second vehicle, wherein the geographical area encompasses and has boundaries defined by the identified routes; and
when the projected route and the geographical area intersect with each other, generate a message indicating a presence of the first vehicle within the geographical area of the second vehicle.

10. The system of claim 9, wherein determining the geographical area is based on map data comprising road infrastructure.

11. The system of claim 9, wherein the at least one processor is further configured to:
receive updated location coordinates of the first vehicle;
determine that a location of the first vehicle has become closer to the location of the second vehicle based on the updated location coordinates of the first vehicle;
reduce the time interval by an amount of time corresponding to a travel time of the first vehicle to travel from a location of the location coordinates to a location of the updated location coordinates; and
regenerate the geographical area to have a smaller area based on the reduced time interval.

12. The system of claim 9, wherein the at least one processor is further configured to:
receive a communication indicating the first vehicle no longer has priority over the second vehicle; and
remove a presence of the first vehicle from the geographical area displayed on the second vehicle.

13. The system of claim 9, wherein the second vehicle receives updated location coordinates of the first vehicle on a periodic basis.

14. The system of claim 9, wherein the geographical area is one of a polygon, oval, star, diamond, and a circle.

15. The system of claim 9, wherein the at least one processor is further configured to:
determine that a distance between the first vehicle and the second vehicle has decreased;
automatically reduce the time interval; and
recompute the geographical area to have a smaller area.

16. The system of claim 9, wherein generating the message is based on the first vehicle having priority over other vehicles related to usage of a road infrastructure.

17. A computer program product for monitoring proximity between a first vehicle and a second vehicle, the computer program product comprising one or more computer readable storage media collectively having program instructions embodied therewith, the program instructions executable by a processor to:
receive by the second vehicle route information describing a projected route that the first vehicle is projected to follow and location coordinates of the first vehicle;
identify by the second vehicle a plurality of routes in different directions from a location of the second vehicle, wherein a distance of each identified route of the plurality of routes is sufficient to be traveled by the second vehicle within a predetermined time interval;
determine a geographical area by the second vehicle, wherein the geographical area encompasses and has boundaries defined by the identified routes; and
when the projected route and the geographical area intersect with each other, generate a message indicating a presence of the first vehicle within the geographical area of the second vehicle.

18. The computer program product of claim 17, wherein the program instructions are executable by the processor to:
receive updated location coordinates of the first vehicle;
determine that a location of the first vehicle has become closer to the location of the second vehicle based on the updated location coordinates of the first vehicle;
reduce the time interval by an amount of time corresponding to a travel time of the first vehicle to travel from a location of the location coordinates to a location of the updated location coordinates; and
regenerate the geographical area to have a smaller area based on the reduced time interval.

19. The computer program product of claim 17, wherein the program instructions are executable by the processor to:
receive a communication indicating the first vehicle no longer has priority over the second vehicle; and
remove a presence of the first vehicle from the geographical area displayed on the second vehicle.

20. The computer program product of claim 17, wherein the program instructions are executable by the processor to:
determine that a distance between the second vehicle and the first vehicle has decreased;
automatically reduce the time interval; and
recompute the geographical area to have a smaller area.

* * * * *